(12) United States Patent
Husby

(10) Patent No.: US 6,789,819 B1
(45) Date of Patent: Sep. 14, 2004

(54) SENSOR FOR MONITORING AIRBAG DEPLOYMENT

(75) Inventor: Harald S. Husby, Lakeland, FL (US)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 10/391,577

(22) Filed: Mar. 20, 2003

(51) Int. Cl.⁷ .............................................. B60R 21/16
(52) U.S. Cl. ................................... 280/735; 280/743.2
(58) Field of Search .............................. 280/735, 743.2

(56) References Cited

U.S. PATENT DOCUMENTS

| | | | | |
|---|---|---|---|---|
| 5,762,367 A | * | 6/1998 | Wolanin | 280/736 |
| 6,129,379 A | | 10/2000 | Specht | 280/735 |
| 6,250,677 B1 | * | 6/2001 | Fujimura | 280/743.2 |
| 6,315,323 B1 | * | 11/2001 | Pack, Jr. | 280/743.2 |
| 6,328,335 B1 | * | 12/2001 | Mueller | 280/735 |
| 6,511,094 B2 | * | 1/2003 | Thomas et al. | 280/743.2 |
| 6,746,045 B2 | * | 6/2004 | Short et al. | 280/736 |
| 2004/0090053 A1 | * | 5/2004 | White et al. | 280/735 |

FOREIGN PATENT DOCUMENTS

EP          0990567          4/2000

OTHER PUBLICATIONS

Pending US application 10/382,538, Filed: March 7, 2003 Inventor: Pettypiece, Jr. et al. Airbag Deployment Monitor and Sensing Electronics.
Pending US application 10/321,524, Filed: Dec. 18, 2002 Inventor: Husby et al. Airbag Deployment Velocity Sensor.
Pending US application 10/359,257, Filed: Feb. 6, 2003 Inventor: H. Husby Airbag Deployment Rate Sensor with Spool Brake.
Pending US application 10/369,697, Filed: Feb. 21, 2003 Inventor: R. Pettypiece, Jr. Airbag and a Deployment Sensor.

* cited by examiner

Primary Examiner—Paul N. Dickson
Assistant Examiner—Laura B. Rosenberg
(74) Attorney, Agent, or Firm—Patrick Stiennon; Lonnie Drayer

(57) ABSTRACT

An airbag deployment sensor stores a quantity of tape which is drawn out of a cartridge during airbag deployment by one end of the tape which is attached to the inside surface of an airbag. To facilitate assembly of an airbag system, the cartridge is designed with a key for locking the tape against premature extraction from the cartridge during the assembly process. The cartridge is used in combination with a mounting bracket which assures that the tape is free to be extracted from the cartridge once the cartridge is mounted to the bracket because, either the cartridge cannot be mounted to the bracket with the key in place, or the mounting bracket causes the key to move to a non-locking position.

20 Claims, 8 Drawing Sheets

SENSOR FOR MONITORING AIRBAG DEPLOYMENT

FIELD OF THE INVENTION

The present invention relates to airbag sensors which monitor the deployment sequence of an airbag with a tape which is pulled out of the cartridge by an end of the tape which is attached to the inside surface of the airbag.

BACKGROUND OF THE INVENTION

Airbags, originally developed as a passive restraint system, work best in combination with seatbelts and other safety systems. Various systems have been developed to detect an "out of position" vehicle occupant. Sensor systems designed to detect the vehicle occupant's position often require constant monitoring so that in the event of a crash the vehicle occupant's position is known. Sensor systems designed to detect the position of the vehicle occupant have been proposed based on ultrasound, optical, or capacitance sensors.

A simpler type of sensor such as shown in European Patent application EP 0990567A1, employs a plurality of tapes which extend between the front of an airbag and a tape dispensing cartridge mounted on the airbag housing. Tape extraction sensors within the cartridge monitor the rate at which tape is withdrawn from the cartridge and thus can detect airbag impact with a vehicle occupant by a decrease in airbag velocity. Improvements are needed to the known tape cartridges to facilitate installing the cartridges in an airbag module without allowing the tape to be prematurely drawn out of the cartridge.

SUMMARY OF THE INVENTION

The airbag deployment sensor of this invention has a cartridge which stores a quantity of tape that is drawn out of the cartridge during airbag deployment by one end of the tape which is attached to the inside surface of the airbag. In order to facilitate assembly of the cartridge into an airbag system, the cartridge is designed with a means for preventing tape from being prematurely extracted from the cartridge during the assembly process. The cartridge is used in combination with a mounting bracket designed to assure that the tape is free to be extracted from the cartridge once the cartridge is mounted to the bracket. A first embodiment employs a screw or key, which biases a brake member within the cartridge against the tape to prevent it from being extracted. The first embodiment can be used with a mounting bracket that will not allow the cartridge to be mounted so long as the screw or key, which functions to lock the tape within the cartridge, is in its locking position. A second approach is to use a spring biased locking member that biases a brake member within the cartridge against the tape to prevent the tape from being extracted. The second embodiment is used in conjunction with a mounting structure which engages the locking member so as to release the locking member, rendering it inoperative when the cartridge is installed to the mounting structure. A third approach employs the same principle as the first approach but is used with a cartridge that contains a spool on which the tape is wound. A key locks the spool against rotation so preventing tape from being prematurely drawn from the cartridge. Again the cartridge can be used with a mounting structure or bracket which prevents the cartridge from being mounted if the key is in the locking position. A fourth approach, which is similar to the second approach, uses a spring biased member that is biased to a position which prevents a spool from rotating. When the cartridge is installed the mounting structure compresses the biasing spring so that the spring no longer prevents rotation of the spool.

It is a feature of the present invention to provide a cartridge from which a tape is drawn during airbag deployment to measure the rate at which the airbag is deployed, wherein the tape is locked against withdrawal during airbag assembly, but when installed in the airbag module housing the tape can be withdrawn.

Further features and advantages of the invention will be apparent from the following detailed description when taken in conjunction with the accompanying drawings.

DETAILED DESCRIPTION OF THE INVENTION

Figure 1:
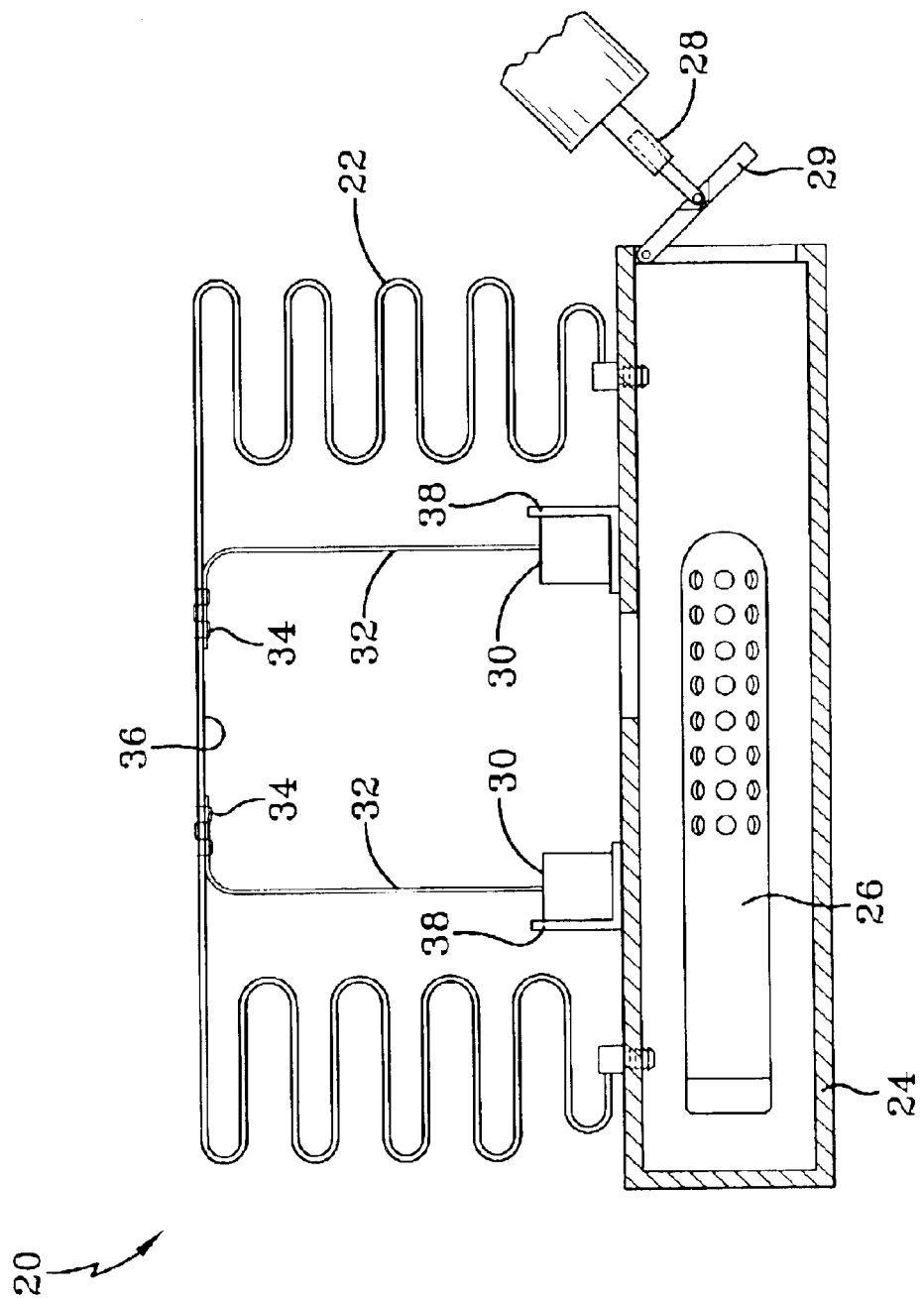
FIG. 1 is a schematic cross sectional view of an undeployed airbag showing the arrangement of a tape cartridge according to the present invention and its mounting bracket.
Figure 2:
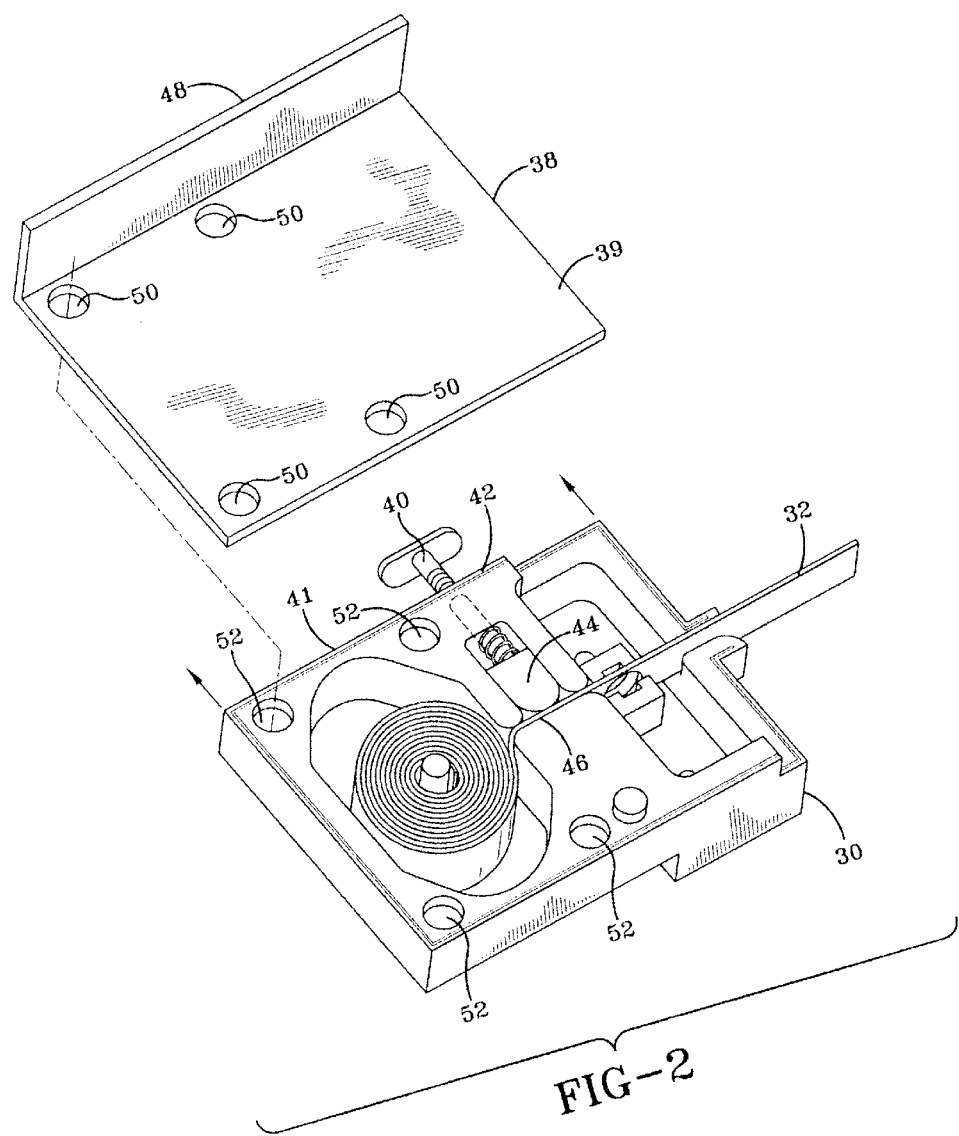
FIG. 2 is an exploded isometric view of the tape dispensing cartridge.

Referring to FIGS. 1–9 wherein like numbers refer to similar parts, an airbag module 20 is shown in FIG. 1. The airbag module 20 has a folded airbag 22 mounted to the airbag housing 24, and an inflator 26 for causing inflation of the airbag. The inflator 26 incorporates a pressure relief valve formed by an actuator 28 and a connected flap 29 which allows the inflation of the airbag 22 to be terminated in response to information provided by airbag deployment sensor cartridges 30. Each deployment cartridge 30 contains a quantity of tape 32. A first end 34 of the tape 32 is attached to the inside surface 36 of the airbag 22 during assembly of the airbag module 20. The tape cartridge 30 is then mounted to a bracket 38, as shown in FIG. 2.

To prevent the tape 32 from being pulled out of the cartridge 30 during assembly, a threaded key 40 which forms a selectively engageable structure, extends through a first wall 41 of the body 42 of the cartridge 30 to bias a braking member 44 against a braking surface 46, to thereby clamp the tape 32 against movement. The bracket 38 has a protruding flange 48 which projects perpendicularly to the mounting plate 39 of the bracket. The flange 48 extends generally parallel to the cartridge first wall 41. The first wall 41 lies adjacent the flange 48, mounting holes 50 in the bracket mounting plate 39 are in alignment with mounting holes 52 in the cartridge 30. The presence of the key 40, protruding from the first wall towards the bracket flange 48, prevents the cartridge 30 from being positioned so that mounting holes 50 on the bracket 38 line up with the mounting holes 52 of the cartridge 30. Thus the key 40 prevents tape from being extracted during the assembly process and the bracket 38 and attached flange 48 prevent the key 40 from being inadvertently left in place after assembly. If the key were to remain in place in the assembled the cartridge would not allow tape 32 to be extracted from the cartridge when the airbag 22 is deployed. With the key 40 removed, the first wall 41 may be brought up against the flange 48, and the cartridge properly mounted to the bracket 38. For clarity in illustration the cover of the cartridge 30 is not shown.

Figure 3:
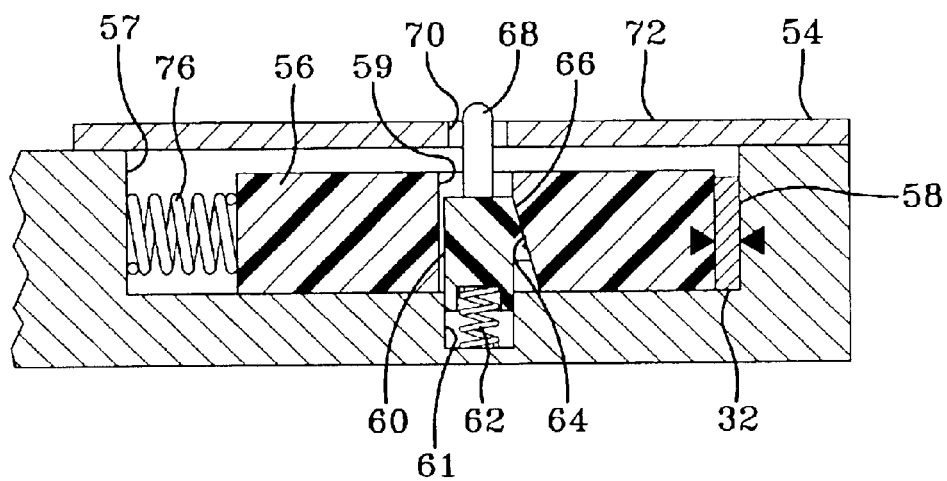
FIG. 3 is a cross-sectional view of a locking mechanism of an alternative embodiment tape dispensing cartridge according to the present invention, shown with the tape locked in position.
Figure 4:
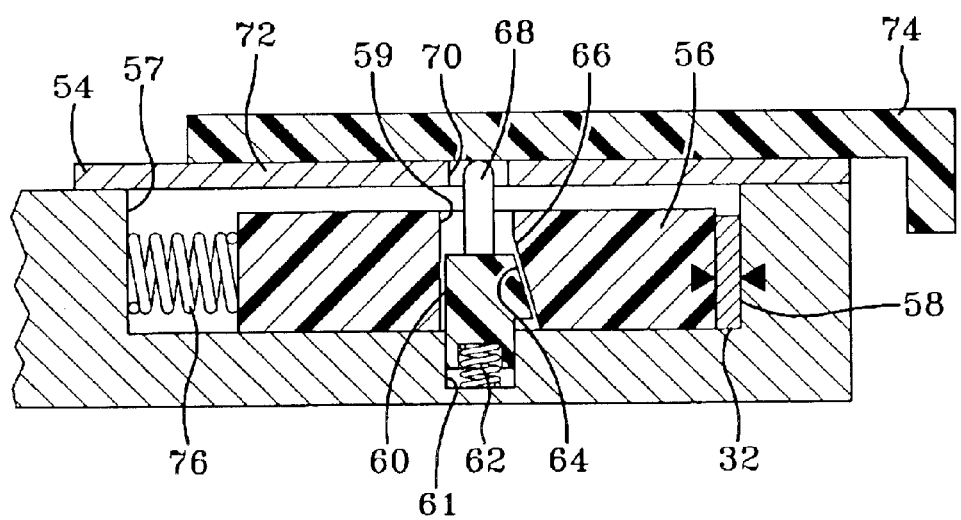
FIG. 4 is a cross sectional view of the locking mechanism of FIG. 3 mounted to a bracket such that tape can be withdrawn from the tape dispensing cartridge.
Figure 5:
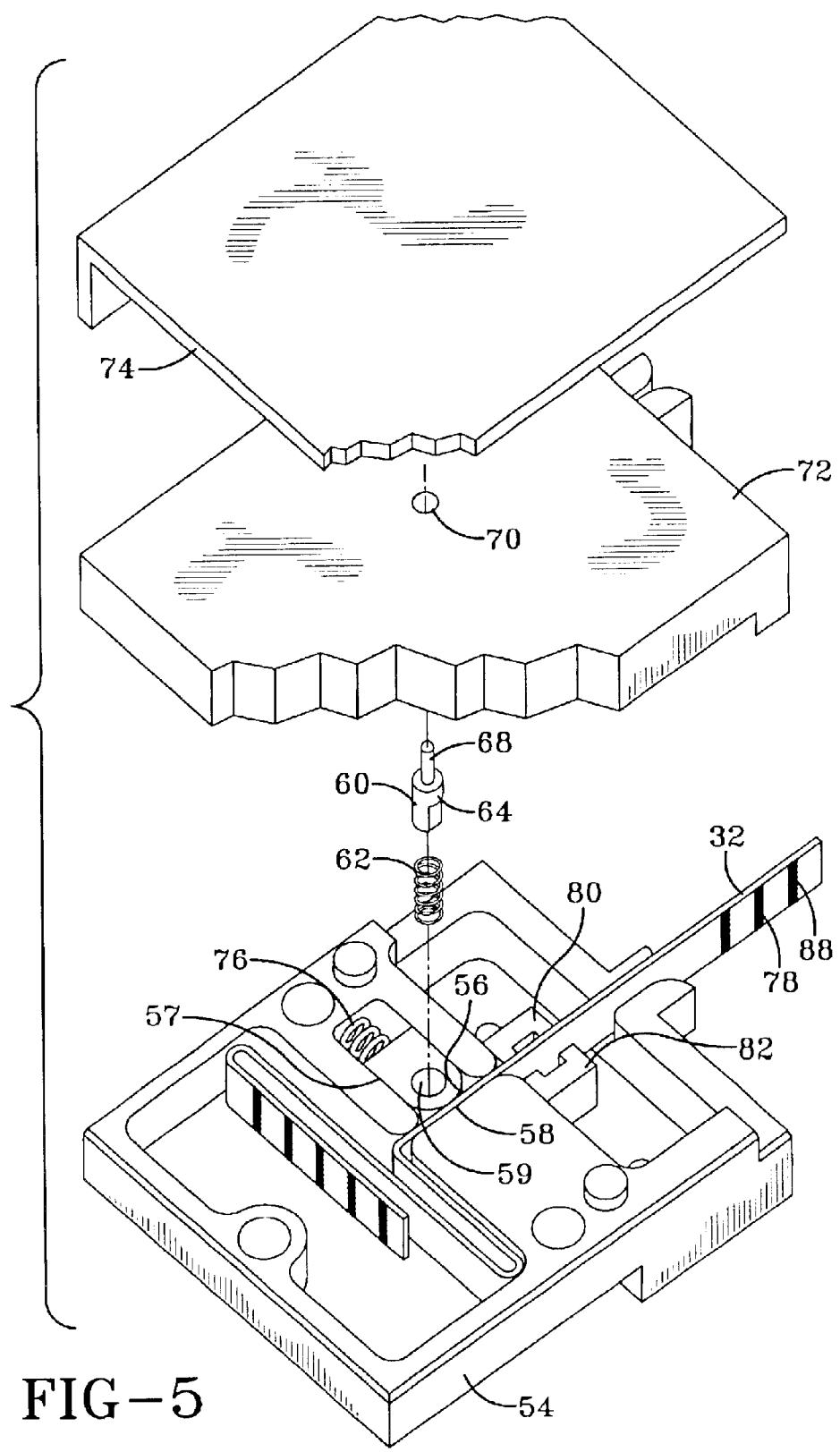
FIG. 5 is an exploded isometric view of tape dispensing cartridge of FIG. 3

An alternative tape cartridge 54, shown in FIGS. 3–5, is similar to the cartridge 30, except that a different mechanism is employed to prevent inadvertent locking of the tape when installed in an airbag system. The cartridge 54 has a braking member 56 that travels within a slot 57 and in use is urged by a spring 76 towards the tape 32 to engage the tape against a braking surface 58 of the cartridge. The braking member 56 has a central opening 59 that receives a cam 60 therethrough.

Prior to assembly, the braking member 56 is held biased against the tape 32 and the braking surface 58 by the cam 60. The cam 60 that forms a selectively engageable structure, may be a plastic element that travels perpendicular to the motion of the braking member within a recess 61 formed in the slot 57. The cam 60 is biased upwardly towards the braking member 56 by a spring 62 positioned within the recess 61. The cam 60 has an upwardly facing inclined cam surface 64 which engages a complementary downwardly facing inclined surface 66 on the braking member 56. When the cam 60 is urged upwardly by the spring 62, the tape 32 is clamped between the braking member 56 and the braking surface 58.

The cam 60 has an upwardly extending post 68 that protrudes through the opening 59 in the braking member 56. The cartridge 54 has a cover 72 with a small opening 70 therein which overlies the cam 60 and through which the cam post 68 protrudes. As shown in FIG. 4, when the cartridge 54 is assembled to a mounting bracket 74, the post 68 is depressed downwardly which causes the cam surface 64 to disengage from the complementary surface 66 on the braking member.

When the cam 60 is disengaged, the braking member 56 may then move within the slot 57, with only the force of the brake spring 76 urging the braking member 56 against the tape 32. In accordance with the principal of an inclined plane, the angle of the cam surface 64 with respect to the direction of the locking force supplied by the spring 62 is such as to provide mechanical advantage providing several times the locking force against the tape 32 compared to the strength of the spring 62.

When the tape cartridge 54 is mounted to the mounting bracket 74, the mounting bracket depresses the cam post 68 and causes the cam 60, which serves as a locking means during transit, to disengage without removing the cam from the tape cartridge 54. With the cam 60 disengaged, the tape 32 can be withdrawn from the cartridge 54 when the airbag 22 is deployed. The tape 32 may be marked with dark bands 78 so a sensor 80 and a light source 82 can be used to detect the rate at which tape 32 is withdrawn from the cartridge 54.

Figure 6:
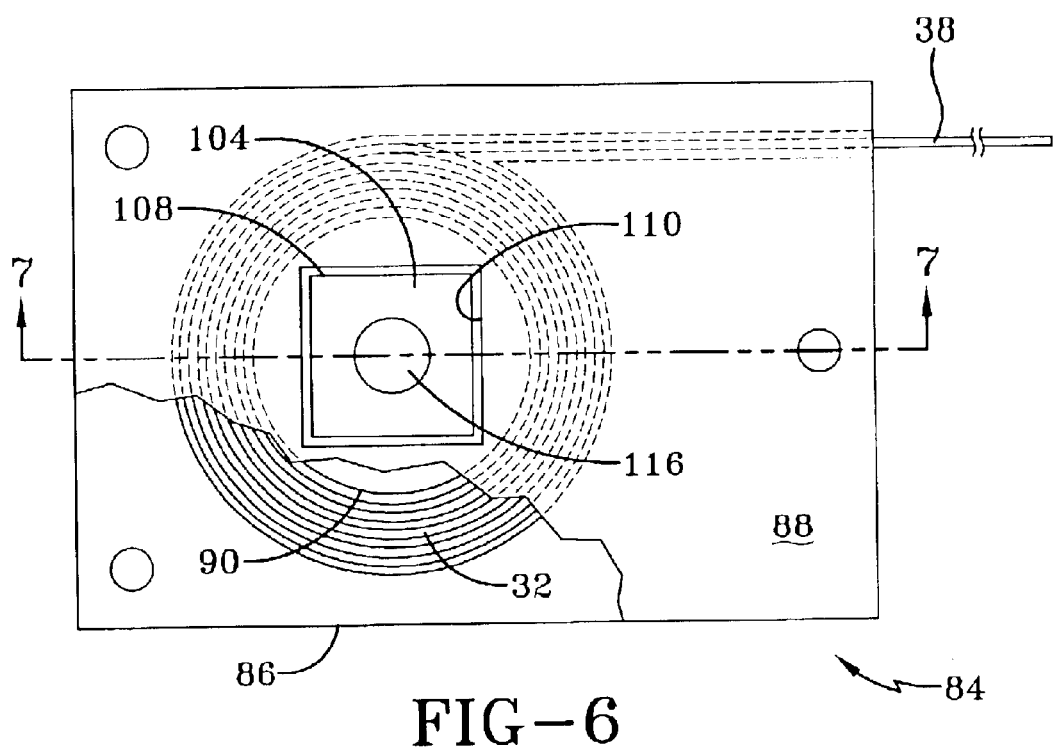
FIG. 6 is a top plan view, partially cut away in section of a further alternative embodiment of the tape dispensing cartridge of this invention.
Figure 7:
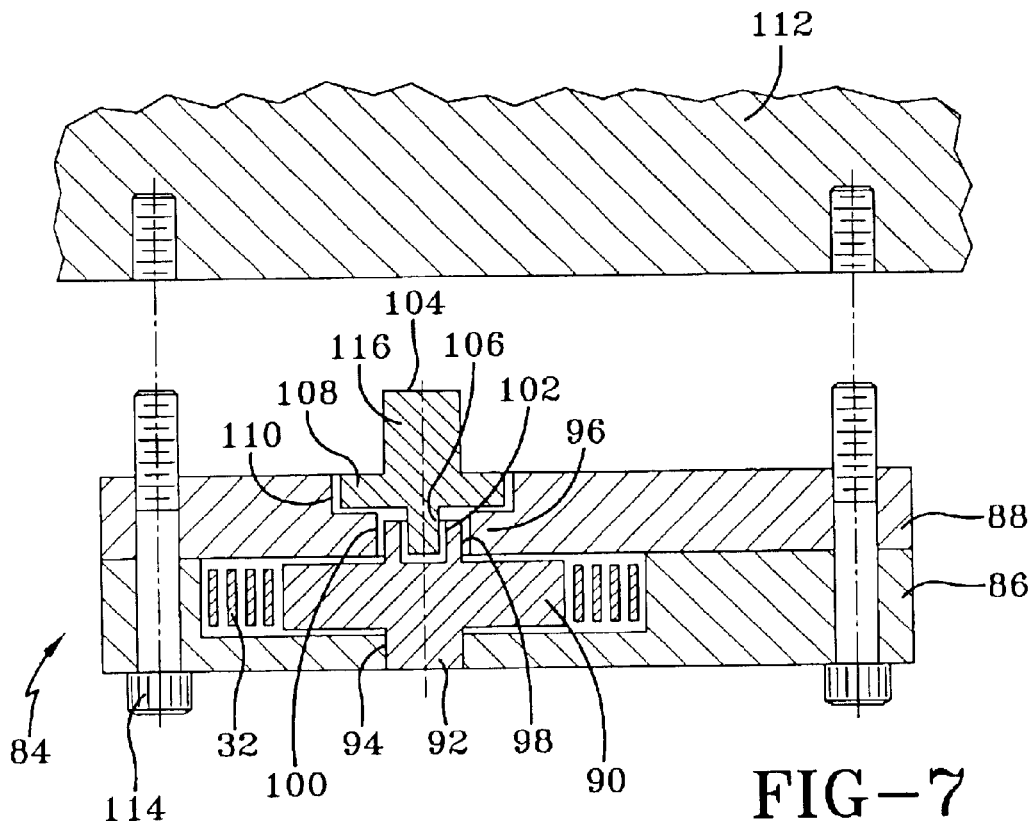
FIG. 7 is a side elevational cross-sectional view of the tape dispensing cartridge of FIG. 6 taken along section line 7—7
Figure 7A:
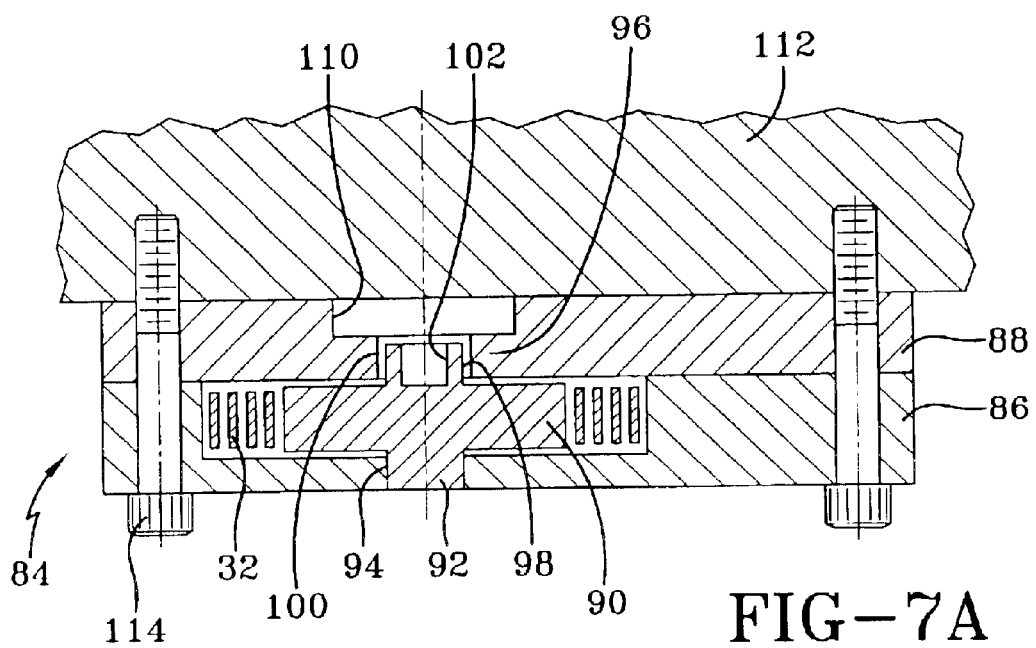
FIG. 7A is a side elevational cross-sectional view of the tape dispensing cartridge of FIG. 7 shown installed on a bracket.

Another alternative tape cartridge 84 configuration is shown in FIGS. 6–7A. The tape cartridge 84 has a body 86 and a cover 88. A spool 90 is located within the body 86, and a quantity of tape 32 is wound around the spool. A shaft 92 protrudes from the spool 90, and the spool rotates about the shaft. The shaft 92 is held for rotation in a first bearing 94 formed by portions of the body 86 and a second bearing 96 formed by portions of the cover 88. Portions 98 of the shaft 92 extend upwardly through an opening 100 in the cover 88. The upwardly extending portions 98 form a hexagonal socket 102. A wrench (not shown) can be placed in the socket 102 to rewind tape 32 onto the spool 90. A locking key 104 that forms a selectively engageable structure has portion 106 which engage the hexagonal socket 102. The locking key has a square flange 108 that sits in a complementary square depression 110 on an outer portion of the cover 88. The locking key 104 interfits with the square depression 110 and the hexagonal slot 102 which locks the spool 90 against rotation with respect to the square depression 110 and thus the cover 88 and the body 86 of the tape cartridge 84. A mounting flange 112 to which the cartridge 84 is mounted by screws 114 interferes with a protruding portion 116 of the key 104 as shown in FIG. 7 and thus the cartridge 84 cannot be mounted to the flange 112, as shown in FIG. 7A, while the key 104 is in place.

Figure 8:
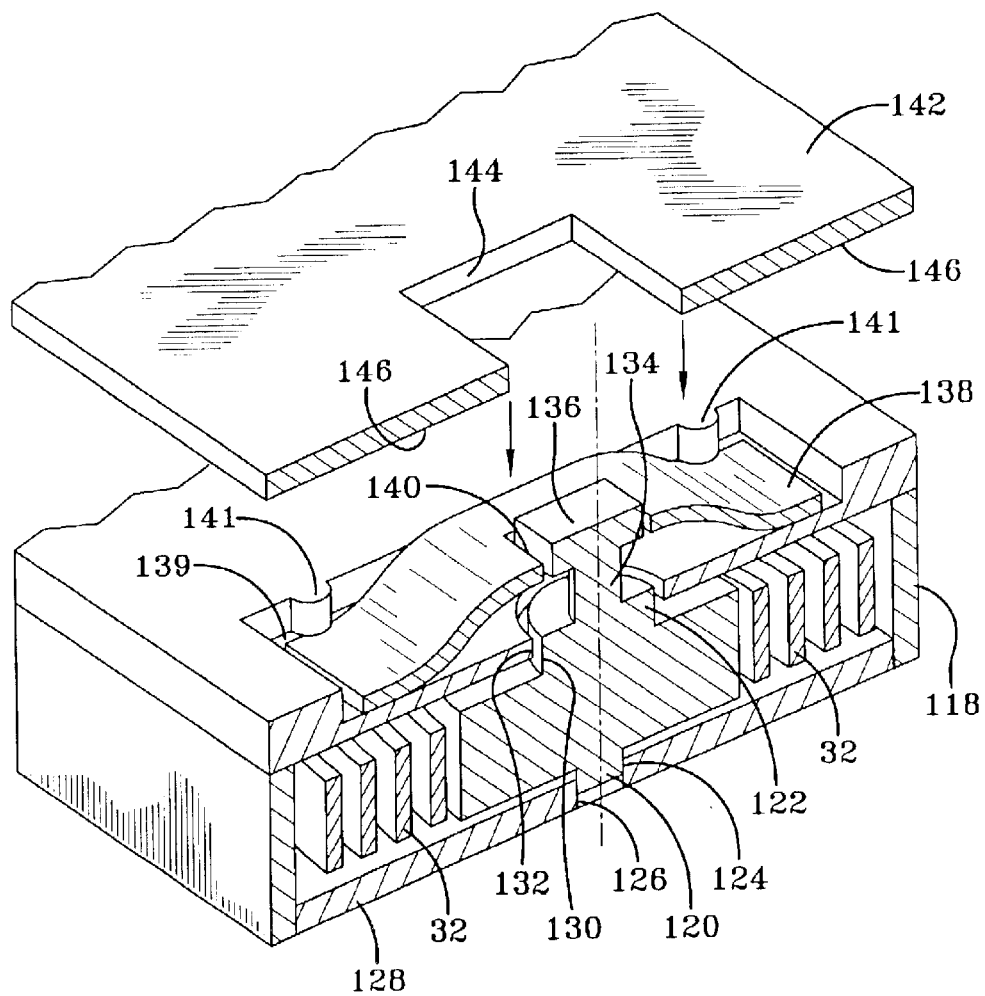
FIG. 8 is an exploded isometric cross-sectional view, partially cut away in section of yet another tape dispensing cartridge of this invention, wherein a tape spool is locked against rotation.
Figure 9:
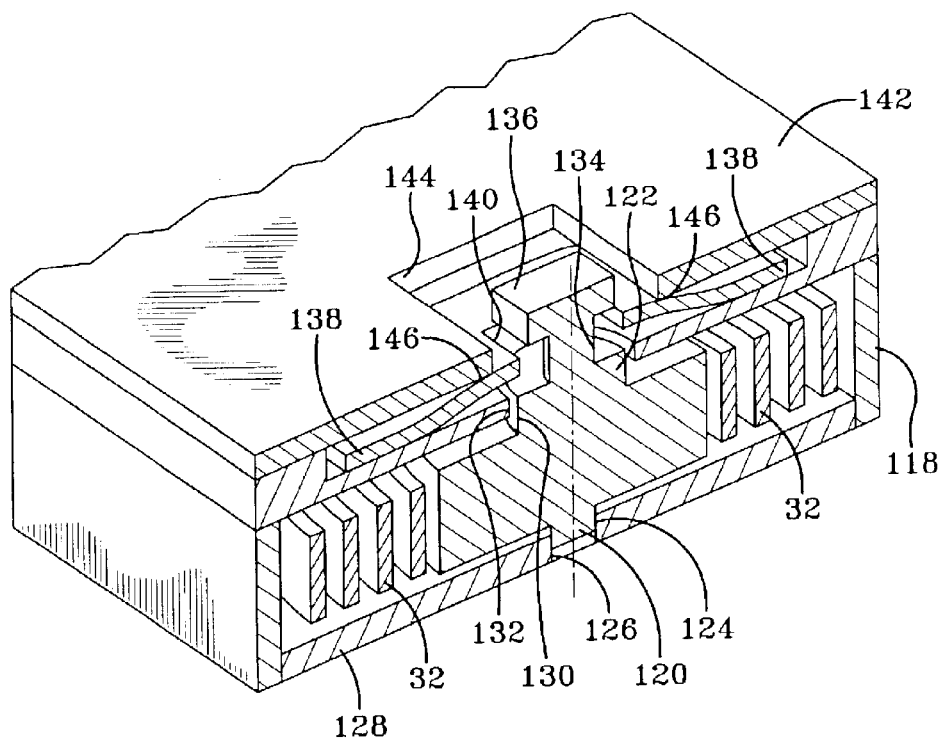
FIG. 9 is an isometric cross-sectional view of the tape dispensing cartridge of FIG. 8 wherein the tape spool is free to rotate.

A further alternative tape cartridge 118 is shown in FIGS. 8 and 9. The tape cartridge 118 contains a spool 120 about which a quantity of tape 32 is wrapped. The spool 120 has a central shaft 122 which has lower bearing portions 124 which engage lower bearing portions 126 on the housing 128 of the cartridge 118. The spool 120 has upper bearing portions 130 that engage upper bearing portions 132 of the housing 128.

A stub shaft extends from the upper bearing portions 130 that terminates in a square key 136. A wave spring 138 with a complementary square hole 140 is positioned so that in its relaxed position the square hole 140 in the spring is positioned about the square key 136 of the stub shaft 134. The spring 138 is held in a depression 139 in the upper surface of the housing 128 by tabs 141 that allow some movement of the spring 138 in the depression 139.

The complementary square hole 140 in the spring 138 prevents the rotation of the square key 136 and thereby prevents the rotation of the central shaft 122 and the spool 120 on which the tape 32 is wrapped. When the tape cartridge 118 is mounted to a mounting bracket 142, however, a central hole 144 in the mounting bracket sits over the square key 136 which terminates the stub shaft 134. The central hole 144 is sufficiently large so that the square key 136 may freely rotate within the central hole 144. When the bracket 142 is in place, portions 146 of the bracket, spaced from the central hole 144, compress the wave spring 138 and thereby push the complementary hole 140 in the spring downwardly away from the square key 136 to be positioned about the smaller circular stub shaft 134. Thus, when the tape cartridge 118 is installed on the bracket 142, the wave spring 138 that forms a selectively engageable structure is compressed so as to allow free rotation of the spool 120 about the central shaft 122.

It should be understood that the invention is not limited to the particular mechanisms illustrated and described, but is directed broadly to the use of a removable key which, when the key is installed, blocks the extraction of tape from the tape cartridge. Additional advantage is achieved if the removable key is used with a bracket which prevents the key from being inadvertently left installed when the tape cartridge is in its final installed position on the bracket. Alternatively the invention is directed to a key which locks a tape cartridge against the withdrawal of tape, but is not removable but rather can be moved to a non-blocking position. Again, a mounting bracket may be used with the tape cartridge to assure that the key is in the non-blocking position when the tape cartridge is installed in its final location.

It should be understood that when a tape is described, the tape could be a plastic film, a metal strip, a woven material, a monofilament line, or a string composed of several fibers or filaments. Generally, tape should be understood to refer to any material connection between the inside surface of the airbag and a cartridge containing a sensor for detecting the rate at which the tape is withdrawn from the cartridge.

It is understood that the invention is not limited to the particular construction and arrangement of parts herein illustrated and described, but embraces all such modified forms thereof as come within the scope of the following claims.

I claim:

1. A sensor for monitoring airbag deployment comprising:
   a cartridge containing a quantity of tape stored within the cartridge;
   an airbag, the quantity of tape having a first end attached to the airbag, such that deployment of the airbag draws tape out of the tape stored within the cartridge:
   a selectively engageable structure mounted to the cartridge, the selectively engageable structure preventing withdrawal of tape in a first position, and allowing tape withdrawal in a second position; and
   a mounting bracket to which the cartridge can be mounted only when the selectively engageable structure is in the second position.

2. The sensor for monitoring airbag deployment of claim 1 wherein the selectively engageable structure is a key which protrudes from the cartridge and which is attached by threads to the cartridge to bias a brake member against a portion of tape of the quantity of tape to prevent the tape from being withdrawn, and wherein when the key is in the second position it is separated from the cartridge.

3. The sensor for monitoring airbag deployment of claim 2 wherein the mounting bracket has a portion which engages the cartridge where the key protrudes so that the cartridge cannot be mounted to the bracket when the key is protruding.

4. The sensor for monitoring airbag deployment of claim 1 wherein the selectively engageable structure is biased by a spring to the first position, and further has a protruding member which can be depressed to cause the selectively engageable structure to move to the second position, and wherein the mounting bracket has a portion which depresses the protruding member when the cartridge is mounted to the mounting bracket.

5. The sensor for monitoring airbag deployment of claim 4 wherein the selectively engageable structure has portions defining a cam which engages a complementary cam surface on a brake member in the first position to bias with mechanical advantage a brake member against a portion of the tape of the quantity of tape.

6. The sensor for monitoring airbag deployment of claim 1 wherein the quantity of tape is stored within the cartridge wound about a spool, and wherein the selectively engageable structure connects the spool to the cartridge, in the first position, to prevent rotation of the spool to prevent withdrawal of tape.

7. The sensor for monitoring airbag deployment of claim 6 wherein the selectively engageable structure protrudes from the cartridge when it is in the first position, so the cartridge cannot be mounted to the mounting bracket.

8. The airbag module of claim 6 wherein the spool is mounted to rotate about a shaft and wherein a portion of the shaft provides a socket that allows the spool to be rotated to wind tape onto the spool.

9. The sensor for monitoring airbag deployment of claim 1 wherein the selectively engageable structure is a spring which in the first position interferes with rotation of a shaft forming part of a spool about which the quantity of tape is wound, the spring in the first position protruding from the cartridge, and the spring in the second position allowing rotation of the shaft, and not protruding from the cartridge so the cartridge may be connected to the mounting bracket.

10. A sensor for monitoring airbag deployment, comprising:
    a cartridge containing a quantity of tape stored within the cartridge;
    an airbag, the quantity of tape having a first end attached to the airbag to draw tape stored in the tape storage within the cartridge when the airbag deploys; and
    a removable locking key mountable to the cartridge and operable to lock the tape against withdrawal.

11. The sensor for monitoring airbag deployment of claim 10 wherein the key protrudes from the cartridge and is attached by threads to the cartridge to bias a brake member against a portion of tape of the quantity of tape to prevent the tape from being withdrawn.

12. The sensor for monitoring airbag deployment of claim 11 further comprising a mounting bracket which has a portion which engages the cartridge where the key protrudes so that the cartridge cannot be mounted to the bracket when the key is protruding.

13. The sensor for monitoring airbag deployment of claim 11 wherein the quantity of tape is stored within the cartridge wound about a spool, and wherein the key connects the spool to the cartridge to prevent rotation of the spool to prevent withdrawal of tape.

14. The sensor for monitoring airbag deployment of claim 13 wherein the key protrudes from the cartridge when it is positioned to connect the spool to the cartridge, so the cartridge cannot be mounted to mounting bracket when the key is positioned to connect the spool to the cartridge.

15. The sensor for monitoring airbag deployment of claim 13 wherein the spool is mounted to rotate about a shaft and wherein a portion of the shaft provides a socket that allows the spool to be rotated to wind tape onto the spool.

16. A sensor for monitoring airbag deployment comprising:
    a cartridge containing a quantity of tape stored within the cartridge;
    an airbag, wherein the quantity of tape has a first end attached to the airbag so that deployment of the airbag draws tape from the tape stored within the cartridge;
    a means for preventing withdrawal of tape from the cartridge; and
    a means for mounting the cartridge such that the cartridge can only be mounted when the means for preventing withdrawal is in a non-operative position which does not prevent tape withdrawal.

17. The sensor for monitoring airbag deployment of claim 16 wherein the means for preventing withdrawal of tape protrudes from the cartridge and is attached by threads to the cartridge to bias a brake member against a portion of tape of the quantity of tape to prevent the tape from being withdrawn, and wherein when the means for preventing withdrawal of tape from the cartridge is in a non-operative position it is separated from the cartridge.

18. The sensor for monitoring airbag deployment of claim 17 wherein the means for mounting the cartridge has a portion which engages the cartridge where the means for preventing withdrawal of tape protrudes so that the cartridge cannot be mounted to the means for mounting the cartridge when the means for preventing withdrawal of tape is protruding.

19. The sensor for monitoring airbag deployment of claim 16 wherein the means for preventing withdrawal of tape has a protruding member which can be depressed to cause the means for preventing withdrawal of tape to move to the non-operative position, and wherein the means for mounting the cartridge has a portion which depresses the protruding member when the cartridge is mounted to the means for mounting the cartridge.

20. The sensor for monitoring airbag deployment of claim 16 wherein the quantity of tape is stored within the cartridge wound about a spool, and wherein the means for preventing withdrawal of tape connects the spool to the cartridge to prevent rotation of the spool to prevent withdrawal of tape.

* * * * *